United States Patent [19]
Mahlum et al.

[11] Patent Number: 5,794,232
[45] Date of Patent: Aug. 11, 1998

[54] CATALOG SERVICES FOR DISTRIBUTED DIRECTORIES

[75] Inventors: David James Mahlum, Spanish Fork, Utah; David James Huntbach, Mesa, Ariz.; Todd Lawson, Lindon, Utah

[73] Assignee: Novell, Inc., Orem, Utah

[21] Appl. No.: 619,821

[22] Filed: Mar. 15, 1996

[51] Int. Cl.$^6$ .................................................. G06F 17/30
[52] U.S. Cl. ........................... 707/3; 707/10; 707/103; 364/222.81; 364/222.83; 364/280; 364/284.4; 364/282.4; 364/242.94; 364/282.1; 395/200.09; 395/800
[58] Field of Search ........................ 395/610, 603, 395/614, 282.4, 200.09, 800; 707/10, 103; 364/282.1, 284.4, 242.94, 222.81, 222.82, 280, 283.4

[56] References Cited

U.S. PATENT DOCUMENTS

| | | | |
|---|---|---|---|
| 4,945,475 | 7/1990 | Bruffey et al. | 364/200 |
| 5,151,989 | 9/1992 | Johnson et al. | 707/10 |
| 5,345,586 | 9/1994 | Hamala et al. | 395/650 |
| 5,361,349 | 11/1994 | Sugita et al. | 395/600 |
| 5,379,424 | 1/1995 | Morimoto et al. | 707/2 |
| 5,408,619 | 4/1995 | Oran | 707/10 |
| 5,423,034 | 6/1995 | Cohen et al. | 395/607 |
| 5,437,029 | 7/1995 | Sinha | 395/600 |
| 5,479,577 | 12/1995 | Linhard | 381/94 |
| 5,495,607 | 2/1996 | Pisello et al. | 707/10 |
| 5,504,892 | 4/1996 | Atsatt et al. | 707/103 |
| 5,511,190 | 4/1996 | Sharma et al. | 707/1 |
| 5,522,044 | 5/1996 | Pascucci et al. | 395/200.52 |
| 5,649,194 | 7/1997 | Miller et al. | 395/616 |

FOREIGN PATENT DOCUMENTS 9411830  5/1994  WIPO .......................... G06F 17/30

OTHER PUBLICATIONS

Steven M. Abraham and Yogen K. Dalal, *Techniques for Decentralized Management of Distributed Systems,* 1980, IEEE Spring COMPCON, CH1491-0.

Bruce Lindsay, *Object Naming and Catalog Management for a Distributed Database Manager,* The 2nd International Conference on Distributed Computing Systems, IEEE 1981, CH1591-7.

Derek C. Coppen and Yogen K. Dalal, *The Clearinghouse: A Decentralized Agent for Locating Named Objects in a Distributed Environment,* Oct. 1981, Xerox Office Products Division Systems Development Department, OPD-T8103.

Frank W. Allen, Mary E. S. Loomis, and Michael V. Mannino, *The Integrated Dictionary/Directory System,* 1982, Computing Surveys, vol. 14, No. 2.

Jerry Mogul, *Representing Information About Files,* 4th International Conference on Distributed Computing Systems, IEEE 1984, CH2021-4.

Douglas Brian Terry, *Distributed Name Servers: Naming and Caching in Large Distributed Computing Environments,* 1985, Xerox Corporation, CSL-85-1, P85-00020.

Douglas E. Comer and Larry L. Peterson, *A Model of Name Resolution in Distributed Systems,* CH2293-9, The 6th International Conference on Distributed Computing Systems, IEEE, 1986.

James M. Bloom and Kevin J. Dunlap, *Experiences Implementing BIND, A Distributed Name Server for the DARPA Internet,* 1986 Summer USENIX.

(List continued on next page.)

Primary Examiner—Thomas G. Black
Assistant Examiner—Jean M. Corrielus
Attorney, Agent, or Firm—Dinsmore & Shohl LLP

[57] ABSTRACT

A method for representing in a database selective objects and data in a distributed directory is disclosed. A distributed directory is accessed. The directory is searched for selective objects and selective associated attributes that satisfy predetermined criteria. One or more records are created to correspond to each selective object satisfying the criteria. Data relating to each selective object is entered into the corresponding record. The records and data are then stored in a database. Preferably, the database is a hierarchal database having sub-records, wherein each sub-record corresponds to a selective associated attribute of the selective object.

35 Claims, 4 Drawing Sheets

OTHER PUBLICATIONS

P. M. Gopal and B. K. Kadaba, *Analysis of A Class of Distributed Directory Algorithms*, 1989, IEEE INFOCOM '89, vol. 1, CH2702-9.

Stuart Sechrest and Michael McClennen, *Blending Hierarchical and Attribute-Based File Naming*, 1992, The 12th International Conference on Distributed Computing Systems, IEEE, 1992, 0-8186-2865-0.

Alan Amtage and Peter Deutsch, *archie -An Electronic Directory Service for the Internet*, 1992, Winter USENIX.

C. Mic Bowman and Chanda Dharap, *The Enterprise Distributed White-pages Service*, 1993, Winter USENIX.

Andreas Paepcke, *An Object-Oriented View Onto Public, Heterogeneous Text Databases*, 1993, 9th International Conference on Data Engineering, IEEE, 1063-6382.

Herman C. Rao and Larry L. Peterson, *Accessing Files in an Internet: The Jade File System*, 1993, IEEE Transactions on Software Engineering, vol. 19, No. 6.

Joann J. Ordille and Barton P. Miller, *Distributed Active Catalogs and Meta-Data Caching in Descriptive Name Services*, 1993, The 13th International Conference on Distributed Computing Systems, IEEE Computer Society Press, 0-8186-3770-6/93.

Udi Manber, *GLIMPSE: A Tool to Search Through Entire File Systems*, 1994, 1994 Winter USENIX.

C. Mic Bowman, Peter B. Danzig, Udi Manber, and Michael F. Schwartz, *Soluble Internet Resource Discovery: Research Problems and Approaches*, 1994, Communications of the ACM, vol. 37, No. 8.

Xinxin Zhang, *Supporting Network Management Through Distributed Directory Service*, 1994, IEEE Journal on Selected Areas in Communications, vol. 12, No. 6.

Daniel L. Silver, James W. Hong and Michael A. Bauer, *X.500 Directory Schema Management*, 1994, The 10th International Conference on Data Engineering, IEEE.

Jinghua Min and Hidehiko Tanaka, *Proposing Multi-Space Directory (MSD) over Tree Directory*, 1995, IEICE Trans. Inf. & Syst., vol. E78-D, No. 5.

Tak W. Yan and Jurgen Annevelink, *A Poweful Wide-Area Information Cliens*, 1995, IEEE COMPON.

C. Mic Bowman, Peter B. Danzig, Darren R. Hardy, Udi Manber and Michael F. Schwartz, *The Harvest information discovery and access system*, 1995, Computer Networks and ISDN Systems 28 (1995) 119-125.

Boon-Ping Chai and Gee-Swee Poo, *An Object-Oriented Approach to the Directory*, 1995, IEEE Singapore International Conference on Networks/International Conference on Information Engineering.

Budi Yuwono, Savio L. Y. Lam, Jerry H. Ying, Dik L. Lee, *A World Wide Web Resource Discovery System*, 1995, World Wide Web Journal, Fourth International World Wide Web Conference.

William R. Tuthill, *Don't Get Caught in the Web: A Fieldguide to Searching the Net*, 1996, IEEE COMCPON.

30 — DSObject
    31 — DSObjectName
    32 — DSBaseClass
    33 — DSCanonicalName
    34 — Attribute
        34a — AttributeName
        34b — AttributeSyntax
        34c — SyntaxValue
    35 — Attribute
        35a — AttributeName
        35b — AttributeSyntax
        35c — SyntaxName
            35d — SyntaxValue1
            35e — SyntaxValue2
            35f — SyntaxValue3
            . . .
        35g — SyntaxValueN
    . . .

CATALOG SERVICES FOR DISTRIBUTED DIRECTORIES

TECHNICAL FIELD

The present invention relates generally to the management of objects in a distributed directory, and will be specifically disclosed in connection with a method for representing in a database objects and data in a distributed directory.

BACKGROUND

Technological advances in microelectronics, digital computers, and software have resulted in the proliferation of computer networks. In such networks, computers telecommunicate between each other and share information, applications, and services. One type of computer network employs a client-server architecture, wherein the portions of network applications that interact with human users are typically separated from the portions of network applications that process requests and information. Often, the portions of an application that interact with the user are called client applications or client software, and the portions of the application that process requests and information are called server applications or server software. In a client-server network environment, client applications and server applications are generally executed on different computers, known as clients and servers, respectively, although servers can be clients as well.

An early form of digital networks were local area networks, commonly referred to as LANs, which consist of a physical collection of computers generally interconnected with network cabling and network interface cards. Historically, LANs comprised a single network server and multiple network clients. The network server manages the network resources, such as files, printers, printer queues, server applications, etc. As part of this management, the network server maintains information on each of the network resources, the identities of the network clients and users, and the scope and the nature of the access available to the network clients and users.

As LANs became more popular, these networks grew in size requiring several servers to manage the needs of clients and users, which made the management of the network increasingly difficult. Logistically, this was difficult because users required access to an increasing number of network resources that were located on an increasing number of network servers. Adding to the difficulty was the multiple server structure itself: macro management of the network servers within a LAN was essential, however, each network server maintained a discrete directory that stored its own unique information and networking services, which required independent micro management. Further adding to the difficulty was the lack of a standard scheme of providing networking services information. As a result, a variety of vendors began offering their own particular networking servers each having unique and idiosyncratic schemes.

The associated difficulties with this insular method of maintaining information of networking services fueled research and development of distributed network directories. With distributed directories, a single directory spans and is shared by multiple networking servers. Thus far, research has resulted in several distributed directory protocols, some of which hold great promise for replacing the large number of insular and idiosyncratic directories that now litter many of the existing LANs and electronic-mail systems. One of the more popular distributed directories exploits the X.500 network services protocol developed and published by the CCITT and Open Systems Interconnect Consortium. Part of the X.500 protocol specification describes a distributed directory wherein information can be created, read and modified by network clients who have applicable access rights, wherein this dynamic information is shared across a plurality of servers and clients. The structure of the information stored in the distributed directory is enforced by the directory schema.

A typical distributed directory contains a collection of objects with associated attributes (also known as properties) tied together by their relationship to each other. For example, FIG. 1 shows an object named "Computer" with some of its associated attributes, such as "Owner", "Operator", "Status", etc. The values of the associated attributes are not shown in FIG. 1, but an example of a value for "Owner" might be "George". Often, objects in a distributed directory and their names (e.g. "Computer" in FIG. 1) represent things that humans relate to when dealing with computers. For instance, some typical objects might represent users, printers, print queues, network files, resources, etc. In addition, objects could represent non-computer related things, such as countries, companies, organizations, departments, buildings, etc. As one with ordinary skill in the art will readily appreciate, an object and its associated attributes can represent virtually anything, whether imaginary or real.

It is often desirable to search for objects in the distributed directory that have certain associated attributes specified in a query criteria. For instance, an operator could search a distributed directory for all users who have the title "Server Operator." Once the results of such a search are returned, the operator could readily view and edit the associated attributes of those objects. A significant problem with searches over a distributed directory is the time required to complete the search. A comprehensive search over the distributed directory must traverse the entire distributed directory, typically requiring queries in multiple servers. As a result, object searches in a distributed directory often require a significant amount of time. Furthermore, such searches can significantly increase network traffic and tax network resources, such as disk I/O, memory, CPU, cache, etc.

SUMMARY OF THE INVENTION

Accordingly, an object of this invention is to provide an improved method for searching for objects and data in a distributed directory.

An additional object of this invention is to provide an rapid method for searching for objects and data in a distributed directory.

Another object of this invention is to provide a method for storing dynamic object data from a distributed directory in a database.

A further object of this invention is to provide a hierarchal model within a database to encapsulate the object data of a distributed directory.

Yet another object of this invention is to provide a method for creating database records representing an object model of a distributed directory so that an operator can have quick access to the information in the database.

Still a further object of this invention is to provide an improved means for searching hierarchal databases.

Additional objects, advantages, and novel features of the invention will be set forth in part in the description that follows and in part will become apparent to those skilled in the art upon examining or practicing the invention. The objects and advantages of the invention may be realized and obtained by means of the instrumentalities and combinations particularly pointed out in the appended claims.

One embodiment of the present invention is a method for representing in a database object data from a distributed directory. The method comprises the following steps:

a) Accessing a distributed directory that includes a plurality of objects. Each of these objects has associated attributes and associated data.

b) Searching the distributed directory for selective objects and selective associated attributes that satisfy a predetermined criteria. Preferably, the predetermined criteria depends upon the type of object, the type of associated attribute, or associated data.

c) Creating a record for each selective object found in the search, wherein each record has a set of subordinate fields. The subordinate fields can include data fields and/or sub-records with their own set of subordinate fields. Preferably, a sub-record subordinate to the record is created for each selective associated attribute.

d) Entering associated data into the subordinate fields that corresponds to the various selective objects. Preferably, the data related to the selective objects is entered into the data fields corresponding to the object, and the data related to the selective associated attributes is entered into the subordinate fields corresponding to the sub-record.

e) Storing in memory the records, subordinate fields, and data in a database. Preferably, the database is a hierarchal database. If a hierarchal database is used, the query interface preferably comprises a mask that allows users to enter SQL queries to search the database.

Still other aspects of the present invention will become apparent to those skilled in the art from the following description of a preferred embodiment, which is simply by way of illustration is one of the best modes contemplated for carrying out the invention. As will be realized, the invention is capable of other different obvious aspects all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and together with their description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

One embodiment of the invention is directed towards NetWare Directory Services ("NDS"), which uses a distributed directory modeled from the X.500 network services protocol. The distributed directory comprises a plurality of objects, wherein each such object includes one or more associated attributes and associated values. NDS permits network administrators to create directory classes using default system attributes or attributes defined by the administrator. Each defined attribute must be based on a finite and defined set of syntaxes (i.e. data types), which syntaxes cannot be modified by the administrator. Using the total set of available attributes, an administrator could theoretically create a virtually infinite variety of customized classes to meet their needs.

Once the classes are defined, end-users who have been given the appropriate rights may create objects based on these classes, which objects are then entered into the distributed directory. Each object must contain all of the mandatory attributes defined by the class definition (which may be none), and each object may contain one or more of the optional attributes. Many attributes have a single value, while other attributes are defined as multi-valued attributes having one or more values (i.e. having multiple data elements). Once entered, users can view and edit objects, the associated attributes, and the values or data associated with the object.

One embodiment of the invention is designed to take these dynamic objects whose names, attributes syntaxes, and values that are distributed across the directory, and store them in a static structured database. In this form, searches may be performed on the database for rapid results without having to search through the distributed directory. Such an embodiment is particularly well suited for storing basic information on users, printers, queues, etc., which can act as a key (stores the distinguished name of each such object) linking the database information to the specific NDS objects.

Figure 1:
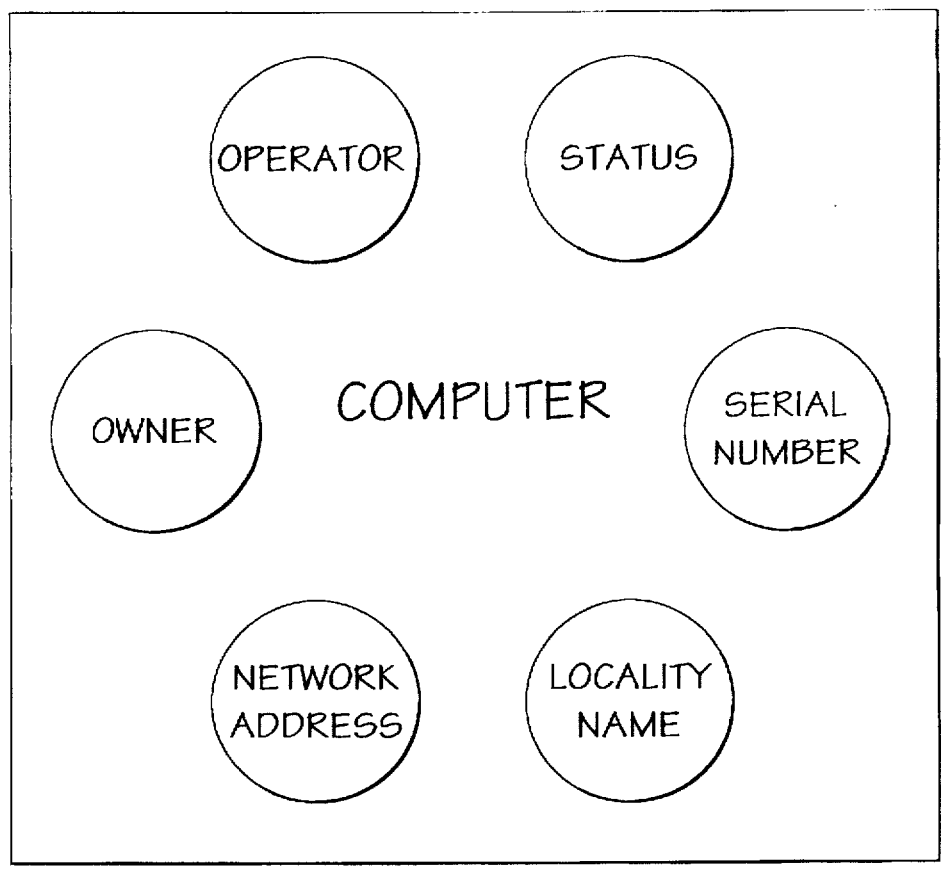
FIG. 1 shows a typical object in a distributed directory with some of its associated attributes.
Figure 2:
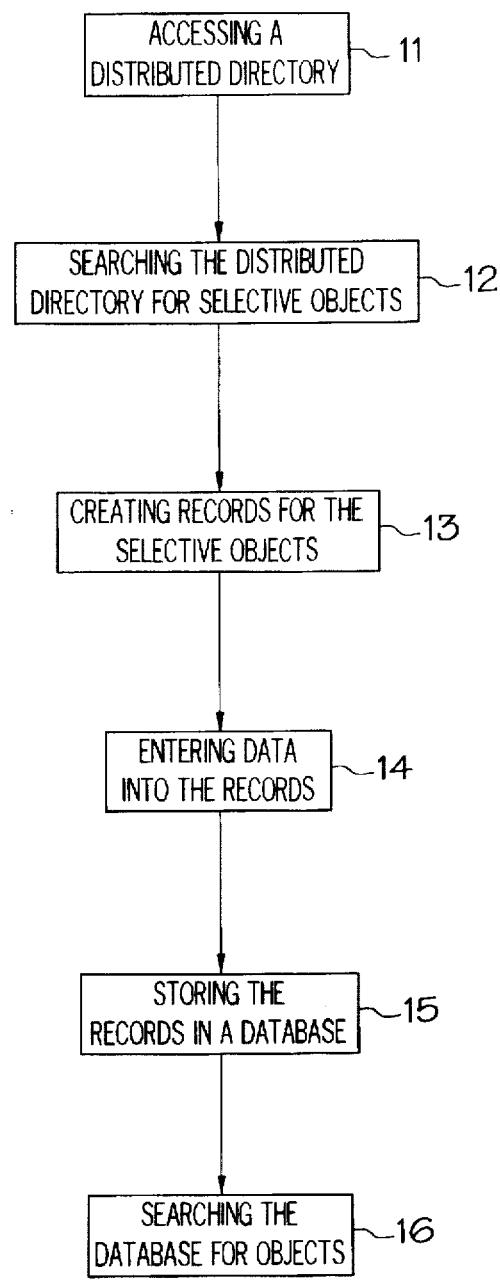
FIG. 2 is a flowchart of a method for representing in a database selective object data from a distributed directory.

The flowchart 10 shown in FIG. 2 demonstrates the steps for representing in a database the object data from a distributed directory. In step 11, the distributed directory is accessed. In step 12, the distributed directory is searched for selective objects and selective associated attributes satisfying predetermined criteria. This step of searching the distributed directory is sometimes referred to as dredging. The dredge can be performed at any time or interval selected by a user.

Preferably, the predetermined criteria used in the dredge depends upon the type of object, the type of associated attribute, or the associated value. For instance, the dredge could be limited to all user objects having the associated attributes of Telephone Number and Facsimile Number. As another example, the dredge could be limited all attributes of user objects having the value "administrator" in the associate attribute Access Rights. As a further example, the dredge could search for all associated attributes of all objects, regardless of the data associated with the object.

Figure 3:
FIG. 3 shows an exemplar structure of a hierarchal record for a database that represents an object in a distributed directory.

In the next step 13, one of more records are created with each record including at least one subordinate field. Each such record corresponds to a selective object that satisfies the predetermined criteria of the dredge. The structure 20 shown in FIG. 3 illustrates such a record. For each selective DSObject (or directory services object) uncovered in the dredge, a record 30 is created. The record 30 includes a variety of associated fields 31–35. Since the record 30 contains subordinate fields, it is sometimes referred to as a parent record, and the subordinate fields 31–35 are referred to as child fields. Some of the fields are data fields 31–33 that relate to a single value. Other fields are sub-records 34, 35 having their own set of associate fields 34a–c, 35a–g, respectively. Such sub-records 34, 35 are referred to as child sub-records due to their subordination to the parent record 30. The fields of the child sub-records may be data fields, such as 34a–c and 35a–b, or sub-records like 35c. Preferably, the child sub-records 34, 35 correspond to dredged associated attributes of the dredged objects. If an attribute has a single data element, such as the attribute associated with the sub-record 34, the subordinate fields 34a–c will preferably comprise three data fields 34a–c. On the other hand, if an attribute has multiple data elements, such as the attribute associated with the sub-record 35, the fields 35a–g subordinate to the sub-record 35 will include two data fields 35a,b and a second sub-record 35c having it own set of subordinate fields 35d–35g.

Returning to FIG. 2, the next step 14 involves entering the values associated with the dredged objects into the subordinate fields of the records that correspond to the objects. In this particular embodiment of the record structure 20, certain object data related to DSObject is entered into the data fields 31–33. The value relating to the field DSObjectName 31 is the name of the object in the distributed directory. The value relating to the field DSBaseClass 32 is the name of the object's base class, which is used for providing queryable attributes of the object (e.g. a query for PRINTER objects). The value relating to the field DSCanonicalName is the key or address for linking the parent record back to the DSObject in the distributed directory.

For each child sub-record corresponding to an associated attribute, the data related to the object (specifically the values related with the attributes) are entered into subordinate fields 34a–c and 35a–g of the corresponding child sub-records 34 and 35, respectively. In this record structure 20, regardless of whether a sub-record has a second sub-record (like sub-record 35) or not (like sub-record 34), the sub-records include the subordinate data fields AttributeName 34a, 35a and AttributeSyntax 34b, 35b. The values entered into to these fields relate to the name of the dredging attributes in the distributed directory. These values are defined by the class of the DSObject. The values entered into to the field AttributeSyntax 35b, 35b relate to the directory services data type associated with the respective attribute.

The name of the third subordinate fields 34c , 35c become the name of the syntax for the corresponding attribute. The type of third field 34c , 35c depends upon whether the dredged attribute has single or multiple data elements. If the attribute has a single data element, such as the attribute associated with the sub-record 34, the third subordinate field 34c is a data field. As such, the data related to the attribute value is entered into the field 34c. On the other hand, if the attribute has multiple data elements, such as the attribute associated with the sub-record 35, the third field 35c is a second sub-record. The values related to the data elements of such an attribute are entered into the subordinate fields 35d–g, and the field names 35d–g correspond to the syntax member name for the data element. As shown here, the fields 35d–g are data fields, but any of these fields could have a third sub-record. As one with ordinary skill in the art will readily appreciate, the levels of sub-records could be infinitely deep.

Figure 4:
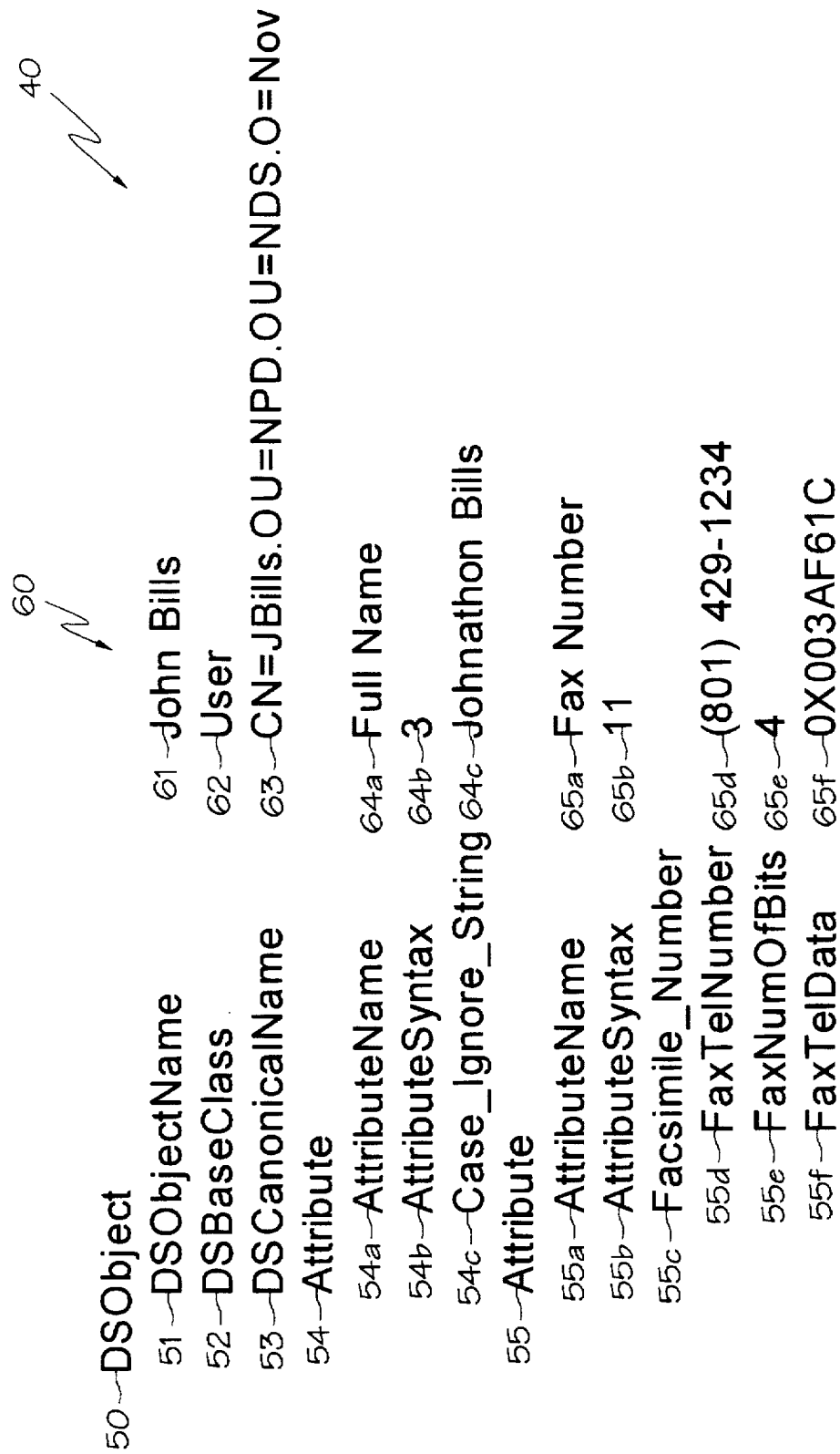
FIG. 4 shows an exemplar hierarchal record for an object with its associated attributes and associated values.

For the purposes of illustration, assume that a dredge has selected the DSObject representing John Bills. Also assume that the dredge selected only two associated attributes of the object: the Full Name and Fax Number. FIG. 4 shows one possible record structure 40 that would represent this DSObject. A parent record 50 is created that corresponds to the selective DSObject found in the dredge. Data 60 associated with the object is entered into data fields DSObjectName 51, DSBaseClass 52, and DSCanonicalName 53. These values include "John Bills" 61, "User" 62, and "CN=JBills.OU=NPD.OU=NDS.O=Novell" 63, respectively.

A child sub-record 54 is created to correspond to the associated attribute Full Name. Since this attribute has a single data element, the sub-record 54 includes three data fields 54a–c. The names of the fields are AttributeName 54a, AttributeSyntax 54b, and Case_Ignore_String 54c. The name of the third field 54c corresponds to the SyntaxName of the attribute. The values "Full Name" 64a, "3" 64b, and "Johnathon Bills"64c, which are all related to the attribute, are entered into fields 54a–c, respectively.

A child sub-record 55 is created to correspond to the associated attribute Fax Number. Since this attribute has multiple data elements, the subordinate fields of the sub-record include two data fields 55a,b and one sub-record 55c. The field names for the first two fields are AttributeName 54a and AttributeSyntax 54b. The values "Fax Number" 65a and "11" 65b, which are related to with the attribute, are entered into the respective fields 54a,b. The name of the third field 55c is the name of the syntax, which is Facsimile_Number. Similarly, the names of the subordinate data fields 55d are labeled with corresponding syntax member names, which in this example are FaxTelNumber 55d, FaxNumOfBits 55e, and FaxTelData 55f. Values related to the data elements of the attribute are entered for the data fields 55d–f, which in this example are "(801) 429-1234" 65d, "4" 65e, and "0X003AF61C" 65f, respectively.

In one embodiment of the invention, the steps of creating records 13 and entering data 14 are performed using nested while loops, as illustrated in the following pseudo-code:

```
while NWDSList
{
    NWDSGetObjectCount
    for i < number of objects
    {
        NWDSGetObjectName
        NWDSCanonicalizeName
        DSCATAddNewObject
        /* adds ObjectName,BaseClass, & CanonicalName */
        while NWDSRead
        {
            NWDSGetAttrCount
            for j < DSAttrCount
            {
                NWDSGetAttrName
                DSCAAddNewAttribute
                /* adds attribute and syntax */
                for k < AttributeCount
                {
                    NWDSComputeAttrValSize
                    Malloc buffer
                    NWDSGetAttrVal
                    DSCatAddAttrVal
                    /* adds attribute values */
                }
            }
        }
    }
}
```

Returning to FIG. 2, the next step 15 involves storing in memory the records, subordinate fields, and entered values in a database. This database is sometimes referred to as a catalog, which can be entered as an object in the distributed directory. In this embodiment, the catalog is a hierarchal database, which is well suited to represent the hierarchal nature of objects and associated attributes in NDS. While the catalog could also take the form of a relational database, a hierarchal database is preferred in this embodiment, in part, because it uses relatively little memory compared to comparable relational databases. To reduce network traffic, it is preferred that the catalogs are kept on non-replicated partitions in the distributed directory, which will in turn prevent the catalogs from being replicated.

The next step 16 is not specifically directed towards representing object data in a database. Rather, this step 16 is directed towards using the catalog, which involves searching the catalog for objects. This can be achieved using standard database query tools, which has the marked advantage of being significantly quicker than a comparable query in a distributed directory. Once an object is found in the database, the user can access the data related to a selective object by selecting the record associated with the object to view the dredged information. Similarly, a user can access the DSObject in the distributed directory by selecting the record associated with the object, which access is possible through the field DSCanonicalName 33.

If the catalog is a hierarchal database, a user can use a variety standard queries. As one with ordinary skill in the art will readily appreciate, current query mechanisms can be cumbersome in hierarchal databases, which can require a cryptic set of restriction clauses that must be built one piece at a time. Furthermore, such queries can become extremely long such that a user cannot view the entire query at the same time which makes edits to the query difficult.

Ideally, a database query should be compatible with the Structured Query Language ("SQL"). SQL is well known and accepted in the art because its queries have English-like aspects, are viewable, and are editable, thus making SQL relatively simple to use. However, SQL is based on a relational database model making it incompatible with hierarchal databases. One option it to translate a hierarchal database into a relational database, which is row/column based, however, doing so is often impracticable because such a translation often requires prohibitive amounts of processing and memory.

One technique for blending the respective advantages of hierarchal databases and SQL queries is to provide an SQL mask for the hierarchal database, which provides an SQL-like interface that lets users send simple SQL queries to the hierarchal database. One such mask takes the form of a series of Application Programing Interfaces ("API's"), which can be integrated into the front-end of a distributed directory using a variety of techniques, including Snap-In modules, Object Linking and Embedding ("OLE"), Dynamic Link Libraries ("DLL's"), or directly integrated into an application. One such set API's include the following functions:

CATOpenCatDB This function opens an existing catalog database and initializes the internal data structures. The only parameter is DbName, which is a character string containing the distinguished name of the catalog object in the distributed directory. This function returns a signed long indicating success or error codes.

CATCmd This function accepts a basic SQL statement, pareses it, and prepares the necessary data structures. The SQL syntax supported by this function are SELECT, which lists one or more attributes contained in the catalog, FROM, which normally applies to relational models only and is accepted as a null, and WHERE, which specifies field values and can include a variety of operators. The function will parse the SQL statement and save it in memory. The SELECT syntax is converted into a number corresponding to the specified attributes in a data dictionary. The FROM syntax is discarded. The WHERE syntax is translated into a hierarchal restriction clause. The only parameter is a character string containing a basic SQL statement. The function returns a signed long indicating success or error codes.

CATBind This function binds the program variables to the returning values in the catalog, and is called once for every value a user wants to return. The parameters include nAttrColumn, which is an enumerated attribute number of the attribute name found in the SELECT clause (e.g. the first attribute is 1, the second attribute is 2, etc.), AttributeName, which is of the type CharStringPointer and has the functionality of limiting the instance of that data syntax to a specific attribute name, and pSyntax, which is a void pointer of the type nSyntaxId that points to the variable to be bound. This function returns a signed long indicating success or error codes.

CATRun This function executes the query in the catalog database and performs some housekeeping actions, such as resetting the database environment, setting-up memory structures, entering a session ID, etc. It has no parameters and returns a signed long indicating success or error codes.

CATNextRecord This function is used in conjunction with CATNextRow, both of which functions are designed to be nested in while loops. The function checks to see if there is any data matching the query criteria or if the data set that matched the criteria has completed. The first time this function is activated, it takes the criteria in the WHERE clause and determines if records exist. If so, the function moves the cursor to the first such record. Thereafter, this function translates the parent-child relationship of attributes and values into a column/row format. The relationship between parent and child is preserved by binding the value with the attribute name. The function requires no parameters and returns a signed long indicating success or error codes.

CATNextRow This function brings back the next row of data from the database and places it in the bound program variables specified by CATBind. Because some sub-records are capable of having 1 to n values, during many of the interactions the bound variables (attributes) will return NULL values while one or two of the variables will always have data. The function requires no parameters and returns a signed long indicating success or error codes.

Below is an example of code implementing these functions:

```
int32 someFunction ()
{
    int32 rCode;
    char* sSQL =           "select DSCanonicalName, DSBaseClass,
                            Case_Ignore_String\from
```

-continued

```
                        cn=mycat.ou=catdept . ou=mydiv .
                        o=mycomp
                        any\ where DSBaseClass = 'Queue'";
    DN_T                sCanonicalName,
                        sBaseClass;
    NWDSCATATTRIBUTE    *sFullName;
if ( (rCode = NWDSCATOpenCatDB
("cn=mycat.ou=catdept.ou=mydiv.o=mycompany"))
!=DC_CAT_NO_ERR).
    return ( rCode );
if ( (rCode = NWDSCATCmd(sSQL)) != DS_CAT_NO_ERR)
    return( rCode );
if ( (rCode = NWDSCATBind(1, NULL,
&sCaononicalName)) != DS_CAT_NO_ERR)
    return( rCode );
if( (rCode = NWDSCATBind(2, NULL, &sBaseClass)) !=
DS_CAT_NO_ERR)
    return ( rCode );
if (rCode = NWDSCATBind(3, "Full Name", &sFullName))
! = DS_CAT_NO_ERR)
    return ( rCode );
if( (rCode = NWDSCATRun()) != DS_CAT_NO_ERR )
    return( rCode );
while( NWDSCATMoreData() !=DS_CAT_ERR_NO_MORE_DATA )
{
    while( NWDSCATNextRow() !=
    DS_CAT_ERR_NO_MORE_ROWS)
    {
    /* user code to handle returned data */
    }
}
}
```

The foregoing description of the preferred embodiment of the invention has been presented for purposes of illustration and description. It is not intended to be exhaustive nor to limit the invention to the precise form disclosed. Many alternatives, modifications and variations will be apparent to those skilled in the art in light of the above teaching. Accordingly, this invention is intended to embrace all such alternatives, modifications and variations that fall within the spirit and broad scope of the appended claims.

We claim:

1. A method in a computer system for representing in a database objects and data from a distributed directory, the method comprising the steps of:
   a) accessing a distributed directory on a plurality of networked computers for managing identities associated with the network, said distributed directory comprising a plurality of objects with each object including associated data;
   b) creating one or more records with each record including at least one subordinate field, wherein each such record corresponds to an object;
   c) entering at least a portion of the associated data into one or more subordinate fields of at least one record, wherein the entered associated data relates to the object that corresponds to each record; and
   d) storing the records, subordinate fields, and entered associated data in a local database.

2. A method as recited in claim 1, wherein each object additionally includes one or more associated attributes.

3. A method as recited in claim 2, wherein the database is a hierarchal database.

4. A method as recited in claim 3, wherein at least one subordinate field of one or more records is a sub-record with each sub-record including one or more subordinate fields, wherein each such sub-record corresponds to an associated attribute and is subordinate to at least one record.

5. A method as recited in claim 4, wherein the entered associated data at least partially includes attribute data related to one or more associated attributes, said attribute data being entered into the subordinate fields of We sub-record Mat corresponds to each associated attribute.

6. A method as recited in claim 1, wherein at least one subordinate field of one or more records is a data field, wherein each such data field is subordinate to at least one record.

7. A method as recited in claim 6, wherein the associated data at least partially includes object data related to one or more objects, said object data being entered into the data fields of the record that corresponds to each object.

8. A method as recited in claim 1, further comprising the step of accessing associated data related to an object by selecting from the database the record associated with the object.

9. A method as recited in claim 1, further comprising the step of accessing an object in the distributed directory by selecting from the database the record associated with the object.

10. A method in a computer system for representing in a database selective objects and data from a distributed directory, the method comprising the steps of:
   a) accessing a distributed ed directory on a plurality of networked computers for managing identities associated the network, said distributed directory comprising a plurality of objects, each such object including one or more associated attributes and associated values;
   b) searching the distributed directory for selective objects and selective associated attributes satisfying predetermined criteria;
   c) creating one or more records with each record including at least one subordinate field, wherein each such record corresponds to a selective object;
   d) entering associated values into one or more subordinate fields of at least one record, wherein the associated values being entered relates to the selective object that corresponds to each record; and
   e) storing the records, subordinate fields, and entered associated values in a local database.

11. A method as recited in claim 10, wherein the database is a hierarchal database.

12. A method as recited in claim 11, wherein at least one subordinate field of one or more records is a sub-record with each sub-record including one or more subordinate fields, wherein each such sub-record corresponds to a selective associated attribute and is subordinate to at least one record.

13. A method as recited in claim 12, wherein the associated values being entered at least partially includes attribute values related to one or more selective associated attributes, which attribute values are entered into the subordinate fields of the sub-record that corresponds to each selective associated attribute.

14. A method as recited in claim 12, wherein at least one subordinate field of one or more sub-records is a second sub-record with each second sub-record including at least one subordinate field, wherein each such sub-record corresponds to a selective associated attribute that includes multiple data elements, wherein each such second sub-record is subordinate to at least one sub-record.

15. A method as recited in claim 14, wherein the associate values being entered at least partially includes element data related to least one element, which element data is entered into the subordinate fields of the second sub-record subordinate to the sub-record that corresponds to each selective associated attribute that includes multiple data elements.

16. A method as recited in claim 10, wherein at least one subordinate field of one or more records is a data field, wherein each such data field is subordinate to at least one record.

17. A method as recited in claim 16, wherein the associated values being entered at least partially includes object data related to one or more selective objects, said object data being entered into the data fields of the record tat corresponds to each selective object.

18. A method as recited in claim 10, wherein the predetermined criteria depends upon the type of object, the type of associated attribute, or the associated values.

19. A method as recited in claim 10, wherein the predetermined criteria includes all objects or all associated attributes.

20. A method as recited in claim 10, firer comprising the step of accessing associated values related to a selective object by selecting from the database the record associated with the selective object.

21. A method as recited in claim 10, firer comprising the step of accessing a selective object in the distributed directory by selecting from the database the record associated with the selective object.

22. A method in a computer system for representing in a database selective objects and data from a distributed directory, the method comprising the steps of;

a) accessing a distributed directory on a plurality networked computers for managing identities associated with the network, said distributed directory comprising a plurality of objects, each such object including one or more associated attributes and associated values;

b) searching the distributed directory for selective objects and selective associated attributes satisfying predetermined criteria;

c) creating a record including a plurality of subordinate fields, wherein the record corresponds to a selective object, wherein the subordinate fields comprise:

(i) one or more data fields; and (ii) one or more sub-records with each sub-record including one or more subordinate fields, wherein each sub-record corresponds to a selective associated attribute;

d) entering associated values into the subordinate fields, wherein the associated values being entered relates to the selective object, e) repeating steps (c) and (d) for a plurality of selective objects; and f) storing the records, subordinate fields, and entered associated values in a local hierarchal database.

23. A method as recited in claim 22, wherein the associated values being entered at least partially includes attribute values related a selective associated attribute, which attribute values are entered into the subordinate fields of the sub-record that corresponds to the selective associated attribute.

24. A method as recited in claim 23, wherein the attribute values relate to the AttributeName and AttributeSyntax of a selective associated attribute.

25. A method as recited in claim 23, wherein the attribute values relate to the SyntaxValue of a selective associated attribute.

26. A method as recited in claim 2, wherein at least one subordinate field a sub-record is a second sub-record including one or more subordinate fields, wherein the sub-record corresponds to a selective associated attribute that includes multiple data elements, wherein the second sub-record is subordinate to the sub-record.

27. A method as recited in claim 26, wherein the associated values being entered at least partially includes element data related to an element of the selective associated attribute, which element data is entered into a subordinate field of the second sub-record.

28. A method as recited in claim 22, wherein the associated values being entered at least partially includes object data related the selective object, said object data being entered into a data field.

29. A method as recited in claim 28, wherein the object data relates to the DSObjectName, DSBaseClass, and DSCanonicalName of the selective object.

30. A method as recited in claim 22, wherein the predetermined criteria depends upon the type of object, the type of associated attribute, or the associated values.

31. A method as recited in claim 22, wherein the predetermined criteria includes all objects or all associated attributes.

32. A method as recited in claim 22, further comprising the step of accessing associated values related to a selective object by selecting from the database the record associated with the selective object.

33. A method as recited in claim 22, further comprising the step of accessing a selective object in the distributed directory by selecting from the database the record associated with the selective object.

34. A record in a database embodied in computer-readable media for representing an object in a distributed directory, said record comprising:

a) one or more subordinate data fields in a local database with each such data field corresponding to data that relates to an object in a distributed directory on a plurality of networked computers for manage identities associated with the network, said object laving associated attributes and data;

b) one or more subordinate sub-records with each such sub-record corresponding to an associated attribute of the object, said sub-records including at least one subordinate field that corresponds to a value related to the associated attribute.

35. A record as recited in claim 34, wherein at least one subordinate field of a sub-record includes a second sub-record that includes a plurality of subordinate fields, said second sub-record corresponding to an associated attribute of the object having multiple data elements.

* * * * *

UNITED STATES PATENT AND TRADEMARK OFFICE
CERTIFICATE OF CORRECTION

PATENT NO. : 5,794,232
DATED      : August 11, 1998
INVENTOR(S) : David James Mahlum, David James Huntbach and Todd Lawson It is certified that error appears in the above-identified patent and that said Letters Patent is hereby corrected as shown below:

Claim 5, column 10, line 30, change [We] to -- the --;
    column 10, line 33, change [Mat] to -- that --.
Claim 10, column 10, line 51, delete [ed].
Claim 17, column 11, line 30, change [tat] to -- that --.
Claim 20, column 11, line 38, change [firer] to -- further --;
Claim 21, column 11, line 42, change [firer] to -- further --.
Claim 26, column 12, line 17, change [2] to -- 22 --.
Claim 34, column 12, line 54, change [laving] to "having".

Signed and Sealed this

Twenty-second Day of December, 1998

Attest:

BRUCE LEHMAN

*Attesting Officer*    *Commissioner of Patents and Trademarks*